US009948121B2

(12) United States Patent
Lee (10) Patent No.: US 9,948,121 B2
(45) Date of Patent: Apr. 17, 2018

(54) HYBRID POWER TYPE OF AUTOMATIC GREASE GUN

(71) Applicant: AHWON CORPORATION, Gunpo-si (KR)

(72) Inventor: Juho Lee, Gunpo-si (KR)

(73) Assignee: AHWON CORPORATION, Gunpo-si (KR)

( * ) Notice: Subject to any disclaimer, the term of this patent is extended or adjusted under 35 U.S.C. 154(b) by 63 days.

(21) Appl. No.: 14/958,770

(22) Filed: Dec. 3, 2015

(65) Prior Publication Data

US 2017/0098945 A1 Apr. 6, 2017

(30) Foreign Application Priority Data

Oct. 2, 2015 (KR) .................. 10-2015-0138931

(51) Int. Cl.
| | | |
|---|---|---|
| *F16N 3/00* | (2006.01) | |
| *F16N 3/12* | (2006.01) | |
| *F16N 23/00* | (2006.01) | |
| *H02J 7/00* | (2006.01) | |
| *B05B 11/00* | (2006.01) | |
| *F16N 13/06* | (2006.01) | |

(52) U.S. Cl.
CPC ........ *H02J 7/0044* (2013.01); *B05B 11/3001* (2013.01); *F16N 3/12* (2013.01); *F16N 2013/063* (2013.01)

(58) Field of Classification Search
CPC .... F16N 3/12; F16N 2013/063; H02J 7/0044; B05B 11/3001
See application file for complete search history.

(56) References Cited

U.S. PATENT DOCUMENTS

| | | | | |
|---|---|---|---|---|
| 4,020,977 A | * | 5/1977 | Hechler, IV ........... | G05B 11/00 222/145.7 |
| 5,404,967 A | * | 4/1995 | Barry ..................... | F16N 3/12 184/105.1 |
| 6,122,966 A | * | 9/2000 | Goodman ........... | F16C 33/6625 184/105.2 |
| 6,339,961 B1 | * | 1/2002 | Goodman ............... | F16N 29/02 184/105.2 |
| 6,482,356 B1 | * | 11/2002 | Brown ..................... | A61C 1/00 134/100.1 |
| 7,044,404 B1 | * | 5/2006 | Kricheldorf .......... | B05B 9/0811 137/206 |

FOREIGN PATENT DOCUMENTS

| | | | |
|---|---|---|---|
| KR | 10-0324469 | 12/2000 | |
| KR | 20-0477638 | 6/2015 | |
| WO | WO 2015093883 A1 | * 6/2015 | ............... F16N 3/12 |

* cited by examiner

*Primary Examiner* — Frederick C Nicolas
(74) *Attorney, Agent, or Firm* — Lucem, PC; Heedong Chae (57) ABSTRACT

A hybrid power type of an automatic grease gun includes a storage tank to store grease, a discharge part to discharge the grease from the storage tank, a drain port to drain out the grease which is discharged from the discharge part, and a power supply part to supply power to the discharge part, to supply power, which is received from moving equipment in connection with the power of the moving equipment, to a rechargeable battery as power to be charged in the rechargeable battery, to first supply the power charged in the rechargeable battery to the discharge, and to automatically and directly supply the power of the moving equipment to the discharge part when the rechargeable battery is fully discharged.

9 Claims, 8 Drawing Sheets

FIG. 1

PRIOR ART

FIG. 2

PRIOR ART

HYBRID POWER TYPE OF AUTOMATIC GREASE GUN

BACKGROUND OF THE INVENTION

1. Field of the Invention

The present invention relates to a hybrid power type of an automatic grease gun which has a power supply structure of basically using power charged in the battery in operations for grease discharge, and automatically using power of the vehicle when the battery is fully discharged, and can discharge the grease by the power charged in the battery when separating from the power of the vehicle, since the battery can be detachably embedded and charged with power of a vehicle.

2. Description of the Related Art

In general, grease is provided as various products depending on the use, the ingredients, and the characteristic thereof. Most products are prepared by mixing a liquid-phase mineral oil-based lubricant, a metallic soap, and a small amount of water to be a colloid state, and generally have the form of butters. Such grease is used for a friction area provided between a bearing and a rotational shaft to receive a great load and for a part making it difficult to supply oil.

The use range of the grease is not limited. Accordingly, the grease has been used in various devices, systems, and actuators in various industrial fields.

Regarding heavy equipment, heavy equipment, such as an excavator or a wheel loader employs hydraulic oil pressure as the power source thereof, and thus includes a hydraulic pump, a hydraulic motor, a fluid tank, and a filter necessary for the hydraulic oil pressure. The heavy equipment has many loaded parts, so that the heavy equipment requires the injection of the grease therein for lubrication.

In addition, a hand-operated grease gun has been extensively used for the injection of the grease into the heavy equipment until lately.

Hereinafter, a manner of using the hand-operated grease gun will be described in brief. After a grease discharge hose or a nipple of the grease gun is inserted into a grease nipple of the heavy equipment, grease is injected into a grease injecting port (grease nipple) of the heavy equipment by applying force to the hand-operated grease gun.

However, the operation of using the hand-operated grease gun is very hard for a relevant worker since the force of the work is too much required in the process of injecting the grease, and a large amount of grease is discharged.

Accordingly, Korean Patent Registration No. 10-0324469 (Title of the Invention: Chargeable grease gun) discloses a chargeable grease gun that can automatically inject grease and have portability.

Hereinafter, the chargeable grease gun will be described in brief. The chargeable grease gun includes a gun-shaped body embedded therein with a chargeable motor, and including a body having a front end from which a motor shaft protrudes, a handle having a button to turn on/off the motor, and an operating switch to control the operation of the motor, a transparent cylinder mounted on the front end of the body through an adaptor and having scales formed on the surface thereof to check the filling of the grease and an amount of injected grease, a bolt-shaped screw shaft embedded in the cylinder and coupled to the motor shaft of the motor to rotate together with the motor, a pressing plate having the shape of nut screwed with the screw shaft, transferring in an axial direction due to the rotation of the screw shaft, and serving as a piston to apply pressure to the grease in the cylinder, and a nozzle coupled to a front end of the cylinder to guide the discharge of the grease.

Hereinafter, the operating procedure of the chargeable grease gun will be described in brief. In the state that the grease is filled in the cylinder, the nozzle makes contact with the nipple of a rotating device and the button provided in the handle is pressed to operate the chargeable motor. If the chargeable motor is operated as described above, the motor shaft is rotated to rotate the screw shaft. In addition, the screw shaft is not moved, but idle-rotates at the position thereof. If the screw shaft is rotated, the pressing plate having the shape of the nut is moved forward to apply the pressure to the grease in the cylinder. Accordingly, the grease is pushed to the nozzle, so that the grease is discharged through the nozzle and thus injected into the nipple of the rotating device.

However, according to the chargeable grease gun, when the chargeable motor is fully discharged in the process of injecting the grease, the injecting of the grease is stopped and cannot be resumed until the chargeable motor is charged with power again. Accordingly, the charging state of the chargeable motor must be inconveniently regularly managed. If the chargeable motor is carelessly managed, the chargeable grease gun may not be used at a proper time. Furthermore, if a charging place is not provided in the state that the chargeable motor of the chargeable grease gun is fully discharged, the worker must inconveniently move to the charging place.

In addition, according to the chargeable grease gun, one-touch button is provided at the handle for the on/off of the chargeable motor, so that the button may be in an on state instead of an off state by the mistake of a worker when charging the chargeable motor after the chargeable motor has been fully discharged. In this case, the pressing plate may be continuously operated to raise the internal pressure of the cylinder.

Accordingly, the applicant of the present invention has suggested Korean Utility Model Registration No. 20-0477638 (Title of the Invention: Gun for automatically injecting lubricant using the power of a vehicle).

Figure 1:
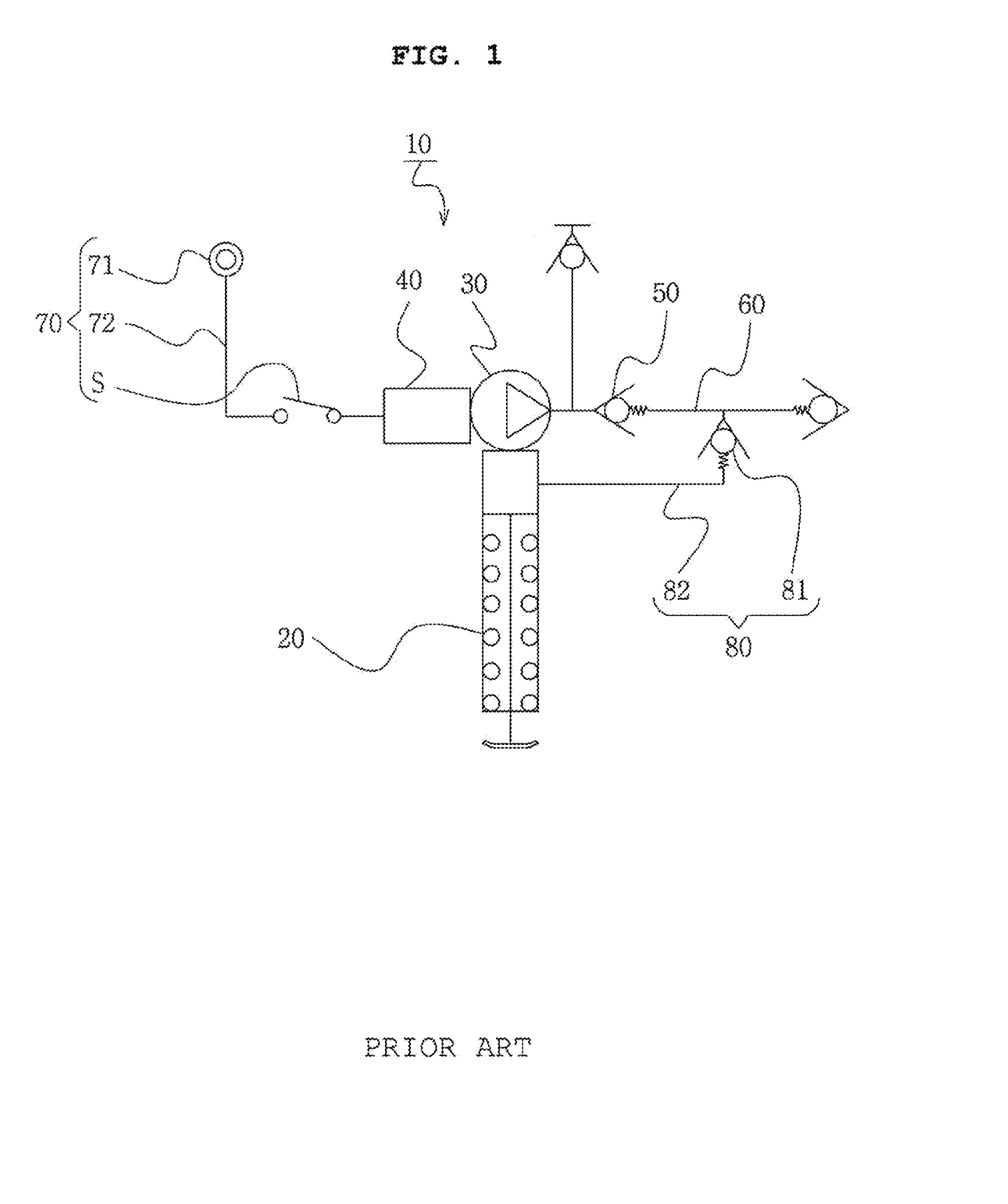
FIG. 1 is a hydraulic circuit diagram of an automatic injection gun according to the related art.
Figure 2:
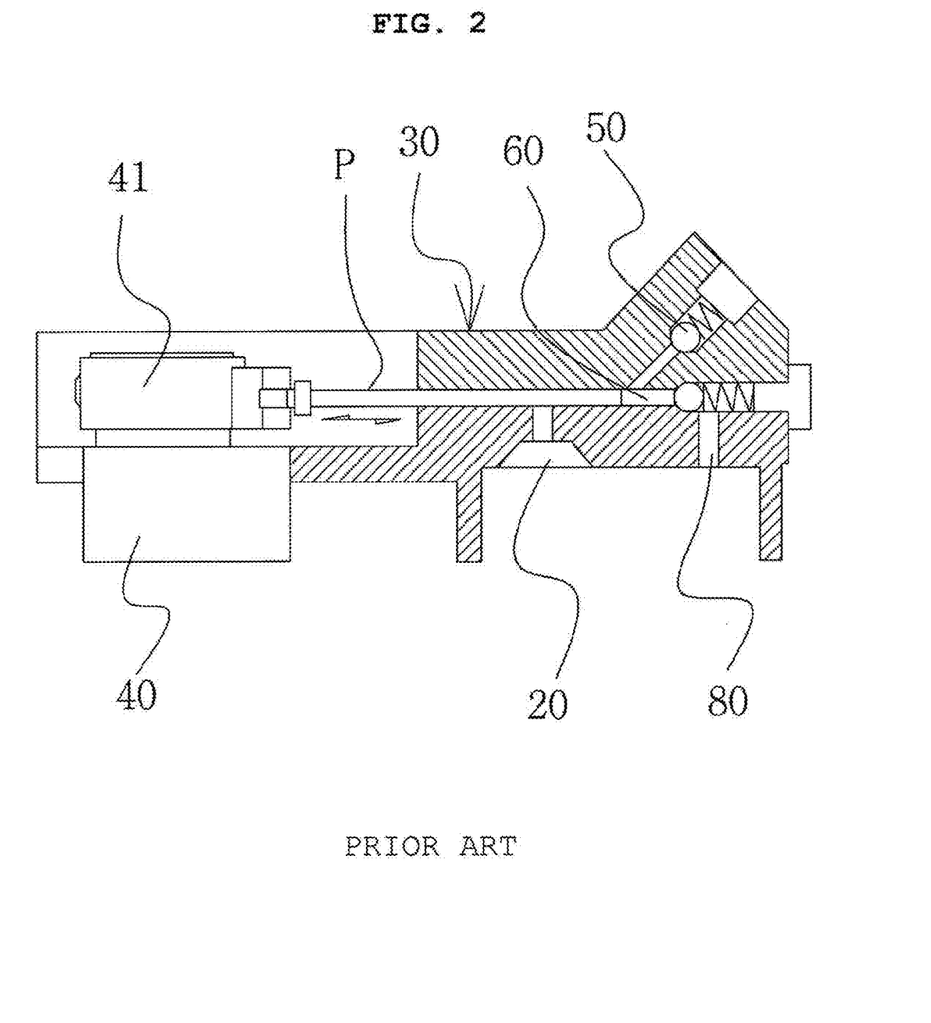
FIG. 2 is a sectional view showing a body of an automatic grease injection gun according to the related art.

Hereinafter, the configuration of the gun for automatically injecting lubricant using the power of the vehicle will be described in brief with reference to FIGS. 1 and 2.

A gun 10 for automatically injecting lubricant using the power of a vehicle includes a pump chamber 30 having a piston P allowing the pumping of lubricant filled in a lubricant tank 20, a motor 40 having a cam 41 to actuate the piston P, a lubricant drain port 50 to drain the lubricant pumped and discharged from the pump chamber 30, a temporary lubricant storing hall 60 to temporarily store the lubricant when the lubricant is pumped in the pump chamber 30 and drained through the lubricant drain port 50, and the discharge work of the lubricant discharge port 50 is temporarily stopped, a power supply part 70 to directly supply DC power, which is provided in heavy equipment or a transportation vehicle, and a bypass part 80 communicating with the temporary lubricant storing hall 60 to transfer the lubricant pumped and discharged from the pump chamber 30 and introduced into the temporary lubricant storing hall 60 into the lubricant tank 20 to prevent the pressure of the lubricant from being increased.

The power supply part 70 includes a power jack 71 put into a DC power charging jack provided in the heavy equipment or the transportation vehicle, a wire 71 to connect the power jack 71 with the motor 40, and a switch S to turn on/off the power supplied through the wire 72.

The bypass part 80 includes a check valve 81 to transfer the lubricant only into the lubricant tank 20 and a bypass line 82 connected with the lubricant tank 20.

The gun for automatically injecting lubricant using the power of the vehicle is operated by using the DC power charging jack provided in the heavy equipment or the transportation vehicle, so that the work of injecting the lubricant can be continued.

In addition, the applicant of the present invention suggests the present invention by more advancing the gun for automatically injecting lubricant using the power of the vehicle.

As prior arts, there are Korean Patent Registration No. 10-0324469 (published on Feb. 27, 2002) "entitled Chargeable grease gun", and Korean Utility Model Registration No. 20-0477638 (published on Jul. 7, 2015) "Gun for automatically injecting lubricant using the power of a vehicle and equipment".

SUMMARY OF THE INVENTION

The embodiment of the present invention provides a hybrid power type of an automatic grease gun which has a power supply structure of basically using power charged in the battery in operations for grease discharge, and automatically using power of the vehicle and equipment when the battery is fully discharged, and can discharge the grease by the power charged in the battery when separating from the power of the vehicle and equipment, since the battery can be detachably embedded and charged with power of a vehicle and equipment.

In addition, the embodiment of the present invention provides a hybrid power type of an automatic grease gun, capable of uniformly maintaining the internal pressure of an internal grease discharge structure and a grease discharge line extending outwardly from the grease discharge structure as grease in the grease discharge line is automatically returned to a storage tank, which is an original storage position, by a predetermined amount even if the grease is continuously discharged inside in the state that the grease is not drained out for the grease supply target.

The embodiment of the present invention provides a hybrid power type of an automatic grease gun in which an amount of grease stored in the storage tank to be discharged out of the storage tank can be checked with a naked eye of a worker, and the storage tank having the grease can be used in both of cartridge and bulk types.

The embodiment of the present invention provides a hybrid power type of an automatic grease gun in which power consumption of the grease discharge part including the motor can be minimized, torque can be increased through the consumption of predetermined power to increase an amount of grease to be discharged, and noise can be reduced when the grease is discharged.

According to the embodiment of the present invention, there is provided a hybrid power type of an automatic grease gun including a storage tank to store grease, a discharge part to discharge the grease from the storage tank, a drain port to drain out the grease which is discharged from the discharge part, and a power supply part to supply power to the discharge part, to supply power, which is received from moving equipment in connection with the power of the moving equipment, to a rechargeable battery as power to be charged in the rechargeable battery, to first supply the power charged in the rechargeable battery to the discharge, and to automatically and directly supply the power of the moving equipment to the discharge part when the rechargeable battery is fully discharged.

The power supply part may include a connection part mechanically and electrically detachably connected with the power of the moving equipment, a charging circuit that is connected with an output terminal of the connection part to supply the power of the moving equipment to the rechargeable battery or the discharge part, automatically cuts off the supply of the power to the rechargeable battery when the rechargeable battery is fully charged with the power, and automatically supplies the power of the moving equipment to the discharge part through the connection part when the rechargeable battery is fully discharged and the rechargeable battery connected with an output terminal of the charging circuit in parallel to the discharge part.

In addition, the power supply part may further include an operating switch connected with the discharge part in parallel connection with the charging circuit and an output terminal of the rechargeable battery.

Further, the connection part may be mechanically and electrically detachable connected with the charging circuit.

In addition, the hybrid power type of the automatic grease gun may further include a grease discharge line extending from the discharge part toward the drain port and a bypass line having ends communicating with the storage tank to circularly supply grease, which flows in the grease discharge line, to the storage tank when the grease is not drained through the drain port in a situation that the grease is discharged from the storage tank through the discharge part.

In addition, the bypass line may include a check valve mounted in a connection area with the grease discharge line or mounted on the bypass line to be open when an internal pressure of the grease discharge line or the bypass line is increased to more than predetermined pressure such that the grease is bypassed to the storage tank.

In addition, the storage tank may include a transparent material such that a residual amount of grease is checked by a naked eye of a user.

Further, the storage tank may include a plate provided inside the storage tank to compress or suck the stored grease in a discharging operation of the discharge part or in a grease charging operation, and a double sealing member coupled to the plate along a circumference of the plate, and having sealing parts formed at both sides of a recessed part formed at a center of the plate such that the two sealing parts make contact with an inner surface of the storage tank.

In addition, the discharge part may include a pump chamber including a sliding piston to pump the grease of the storage tank and connected with the discharge port, and a rotary power part including a cam for an operation of the sliding piston to generate rotary power of the cam.

Further, the rotary power part may include a power source to generate the rotary power, a gear rotating based on the rotary power of the power source, and a rotation pin eccentrically coupled to the gear to rotate while forming a circular trajectory as the gear is rotated, the sliding piston may include a slider formed therein with a rectangular pin sliding hole for insertion of the rotation pin and guidance of sliding along a linear section to reciprocate in a direction perpendicular to a sliding direction of the rotation pin when the rotation pin is rotated, and a piston body having one end longitudinally provided and rotatably and movably coupled to the slider to reciprocate in a direction identical to a sliding direction of the slider, the rotation pin may include a head part having an expanded diameter provided at one end longitudinally provided, and the slider may include a step part to mount the head part along a circumference of the pin sliding hole.

As described above, according to the embodiment of the present invention, the hybrid power type of the automatic grease gun which has a power supply structure of basically using power charged in the battery in operations for grease discharge, and automatically using power of the vehicle and equipment when the battery is fully discharged, and can discharge the grease by the power charged in the battery when separating from the power of the vehicle, since the battery can be detachably embedded and charged with power of a vehicle.

In addition, even if the grease is continuously discharged inside in the state that the grease is not drained out for the grease supply target, as the grease in the grease discharge line is automatically returned to the storage tank, which is an original storage position, by a predetermined amount, the internal pressure of an internal grease discharge structure and the grease discharge line extending outwardly from the grease discharge structure can be uniformly maintained.

In addition, an amount of grease stored in the storage tank to be discharged out of the storage tank can be checked with a naked eye of a worker, and the storage tank having the grease can be used in both of cartridge and bulk types.

In addition, power consumption of the grease discharge part including the motor can be minimized, torque can be increased through the consumption of predetermined power to increase an amount of grease to be discharged, and noise can be reduced when the grease is discharged.

DETAILED DESCRIPTION OF THE INVENTION

The following detailed description of the present invention is provided to allow those skilled in the art to replicate the present invention, and an exemplary embodiment of the present invention will be described with reference to accompanying drawings hereinafter. Hereinafter, the embodiments will be described in detail so that those skilled in the art can sufficiently replicate the present invention. It should be understood that various embodiments of the present invention are mutually different from each other, and not mutually exclusive. For example, specific shapes, structures, and features disclosed herein can be realized in the form of other embodiments falling within the scope of the present invention. The position or the arrangement of individual components in the disclosed embodiments can be modified within the technical spirit and scope of the present invention.

Accordingly, the following detailed description is not interpreted with limited meanings. If the scope of the present invention can be properly explained, the scope of the present invention is limited by attached claims and equivalents of the claims. Like elements having like reference numerals have the same functions or like functions in various aspects.

Terminologies used in this specification are selected from general terminologies by taking the functions thereof into consideration and they may vary depending on the intents of a user or an operator or precedents thereof. In addition, in the specific case, the applicant can coin new words. In this case, the new words will be defined in detail in the detailed description of the present invention. Accordingly, the terminologies used in this specification should be defined based on the substantial meanings thereof and the whole context throughout the present specification.

In the following description of the present invention, when a predetermined part "includes" a predetermined component, the predetermined part does not exclude other components, but may further include other components unless otherwise indicated. In addition, terms "part" and "module" means a unit to perform at least one function or operation, which can be implemented in hardware or software, or the combination of hardware and software.

Figure 8:
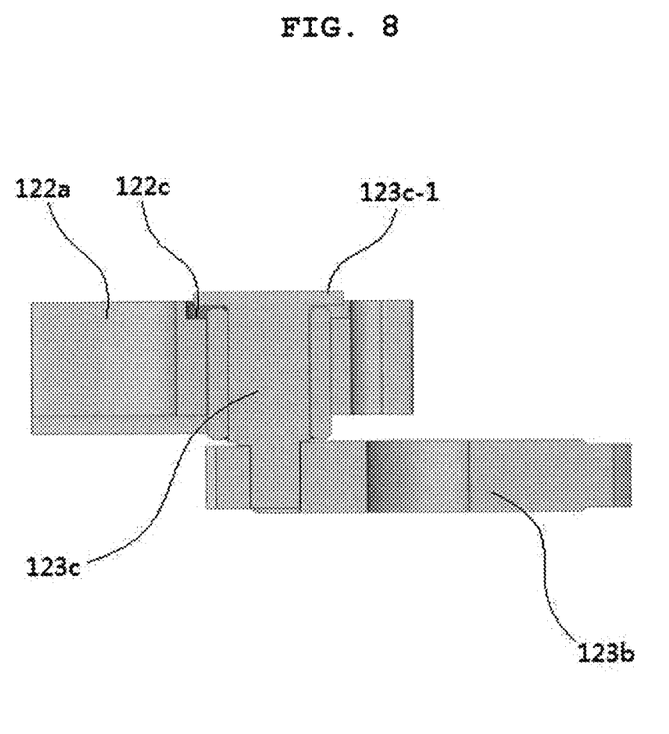
FIG. 8 is a sectional view showing a main component of the discharge part shown in FIG. 7.

Hereinafter, a hybrid power type of an automatic grease gun according to the embodiment of the present invention will be described with reference to FIG. 8.

Figure 3:
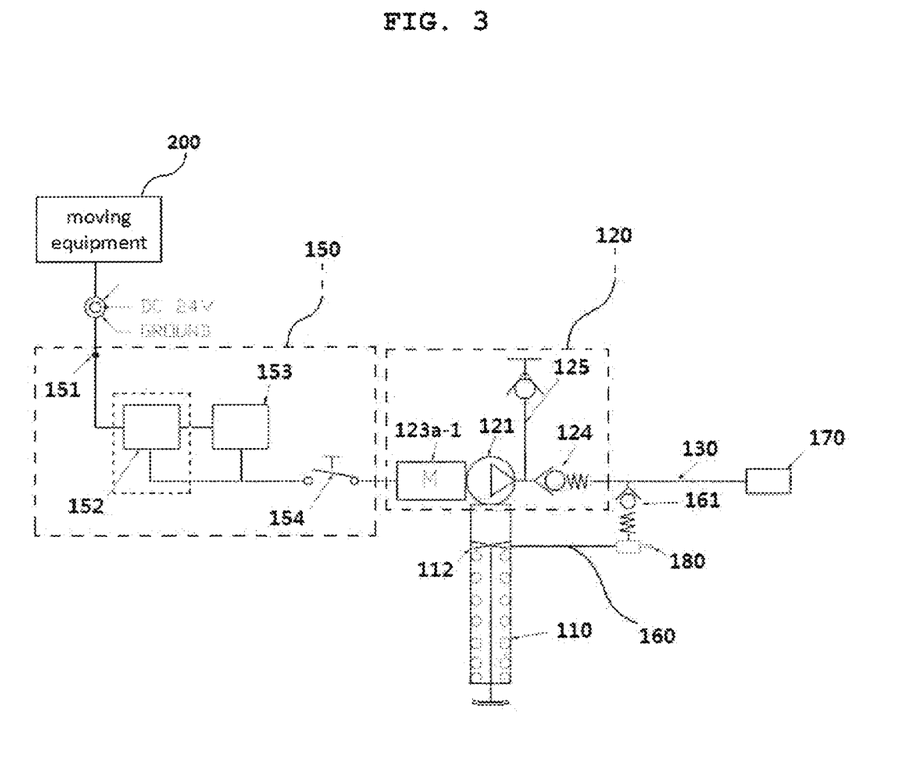
FIG. 3 is a hydraulic circuit diagram showing the whole structure of a hybrid power type of an automatic grease gun according to an embodiment of the present invention.
Figure 4:
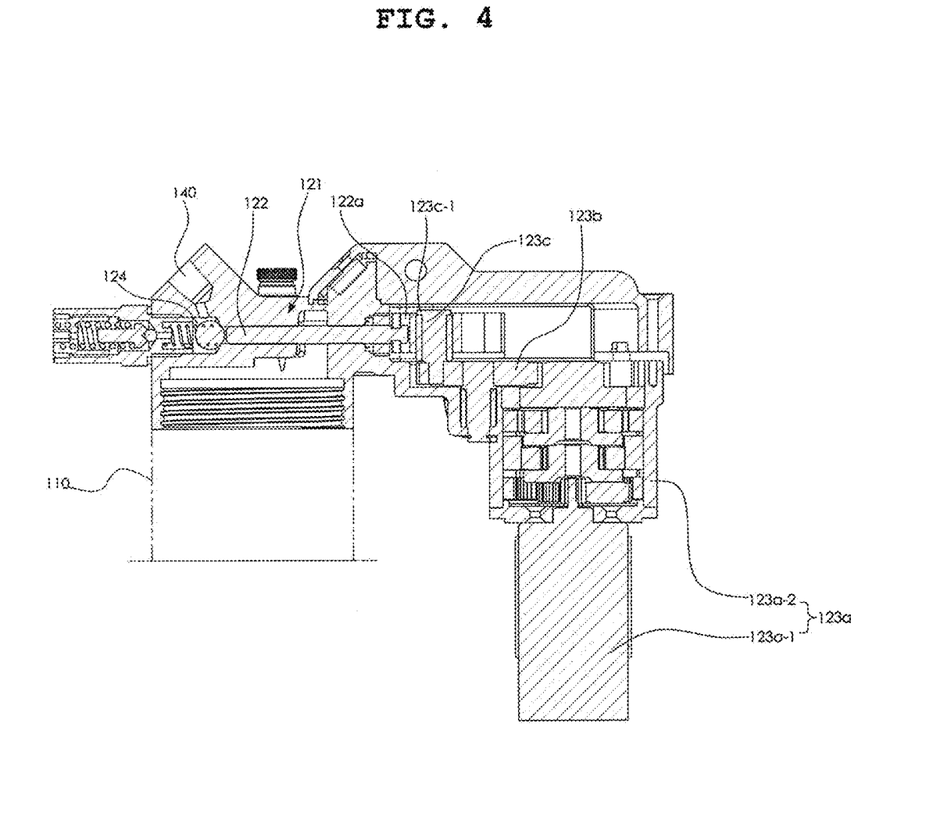
FIG. 4 is a sectional view showing a main component to discharge grease from the hybrid power type of the automatic grease gun according to an embodiment of the present invention.

FIG. 3 is a hydraulic circuit diagram showing the whole structure of a hybrid power type of an automatic grease gun according to an embodiment of the present invention. FIG. 4 is a sectional view showing a main component to discharge grease from the hybrid power type of the automatic grease gun according to an embodiment of the present invention.

As shown in FIGS. 3 and 4, a hybrid power type of an automatic grease gun 100 according to one embodiment of the present invention includes a storage tank 110, a discharge part 120, a grease discharge line 130, a drain port 140, and a power supply part 150. In addition, the hybrid power type of the automatic grease gun 100 according to one embodiment of the present invention may further include a bypass line 160.

The storage tank 110 stores grease, and the hybrid power type of the automatic grease gun 100 according to one embodiment of the present invention supplies the grease from the storage tank 110 to a grease supply target such as a hydraulic pump, a hydraulic motor, a fluid tank, or a filter.

The discharge part 120 discharges the grease from the storage tank 110. Although the discharge part 120 has a configuration having a motor 121 and a pump 122 for an illustrative purpose according to the embodiment, the present invention is not limited thereto. The discharge part 120 may have various configurations sufficient to discharge the grease from the storage tank 110.

The grease discharge line 130 refers to a transfer line for the grease discharged from the discharge part 120 and transferred toward the drain port 140. In detail, the grease from the storage tank 110 is discharged by the discharge part 120 and transferred to the drain port 140 through the grease discharge line 130, and the grease transferred to the drain port 140 is discharged to a grease supply target through the drain port 140.

The power supply part 150 supplies power to the discharge part 120. The power supply part 150 may supply the power, which is received from moving equipment in connection with the power of the moving equipment, to a rechargeable battery 153 to be charged in the rechargeable battery 153 or may directly supply the power to the discharge part 120. In this case, the power supply part 150 may supply the power, which is charged in the rechargeable battery 153, to the discharge part 120 by priority, or may automatically directly supply the power from the moving equipment to the discharge part 120 while the rechargeable battery 153 is fully discharged.

By the power supply part 150, the hybrid power type of the automatic grease gun 100 according to one embodiment of the present invention uses the power charged in the rechargeable battery 153 by priority when performing an operation of discharging the grease from the storage tank 110, and automatically uses the power of the moving equipment when the rechargeable battery 153 is fully discharged. Accordingly, the grease can be constantly supplied under the assumption that the power of the moving equipment exists. In addition, since the hybrid power type of the automatic grease gun 100 according to one embodiment of the present invention may be operated by power charged in the rechargeable battery 153 in the state that the automatic grease gun 100 is separated from the power of the moving equipment, a work to supply the grease to the grease supply target, such as a hydraulic pump, a hydraulic motor, a hydraulic tank, or a filter, may be more easily performed.

Although the moving equipment is a heavy vehicle and equipment general vehicle for the illustrative purpose according to the present embodiment, the present invention is not limited thereto. The moving equipment includes all equipment movable with its own power.

In addition, although the power supply part 150 includes a connection part 151, a charging circuit 152, and the rechargeable battery 153 for the illustrative purpose according to the present embodiment, the present invention is not limited thereto. The following description will be made based on the present embodiment.

The connection part 151 is mechanically and electrically detachably coupled to the power of the moving equipment, and may be used in one selected from various typical connector configurations. In addition, the connection part 151 may be mechanically and electrically detachably coupled to the charging circuit 152. Accordingly, the connection part 151 may be individually carried or kept after completely separated from the moving equipment and the hybrid power type of the automatic grease gun 100 according to the embodiment of the present invention.

The charging circuit 152 is connected with an output terminal of the connection part 151 to supply the power of the moving equipment to the rechargeable battery 153 or the discharge part 120 to automatically cut off the power supply to the rechargeable battery 153 when the rechargeable battery 153 is fully charged with the power, and to automatically supply the power from the moving equipment to the discharge part 120 through the connection part 151 when the rechargeable battery 153 is fully discharged.

The rechargeable battery 153 is connected with the output terminal of the charging circuit 152 in parallel together with the discharge part 120 to supply the power to the discharge part 120. The rechargeable battery 153 is detachably embedded in the hybrid power type of the automatic grease gun 100.

In addition, the charging circuit 152 may include a display part to display "charging in progress", "fully charged", "fully discharged", or "a status that an amount of charged power is lowered to less than a preset amount". Further, the display unit may include an LED lamp, but the present invention is not limited thereto.

In addition, the power supply part 150 may further include an operating switch 154, and the operating switch 154 is connected with the discharge part 120 in the parallel connection with both of the charging circuit 152 and the rechargeable battery 153. In other words, a worker manipulates the operating switch 154 of the power supply part 150 to discharge grease or to stop discharging the grease by the hybrid power type of the automatic grease gun 100 according to the embodiment of the present invention.

The bypass line 160 has both ends longitudinally provided and connected with the grease discharge line 130 and the storage tank 110, respectively, in communication with the grease discharge line 130 and the storage tank 110. The bypass line 160 circularly supplies grease, which floats in the grease discharge line 130, to the storage tank 110 again when the grease is not drained through the drain port 140 in a situation that the grease is discharged from the storage tank 110 through the discharge part.

By the bypass line 160, the pressure of the discharge part 120 and the grease discharge line 130 is constantly maintained as the grease in the grease discharge line 130 is automatically returned by a predetermined amount to the storage tank 110 through the bypass line 160, when the grease of the storage tank 110 is continuously discharged from the discharge part 120 to the grease discharge line 130 in the state that the grease is not drained through the drain port 140. In other words, the bypass line 160 prevents more than predetermined pressure from being formed at a part from the discharge part 120 to the grease discharge line 130.

The bypass line 160 may include a check valve 161 mounted in a connection area with the grease discharge line 130 or mounted on the bypass line 160 to be automatically open when an internal pressure of the grease discharge line or the bypass line is increased to more than a predetermined pressure such that the grease is bypassed to the storage tank 161

In addition, reference numerals 124, 125, 170, and 180 represent a check valve, an air bent, a coupler 170, and a bypass indicator, respectively.

Hereinafter, main components of the storage tank 110 and the discharge part 120 in the hybrid power type of the automatic grease gun 100 according to one embodiment of the present invention will be described with reference to FIGS. 5 to 8.

Figure 5:
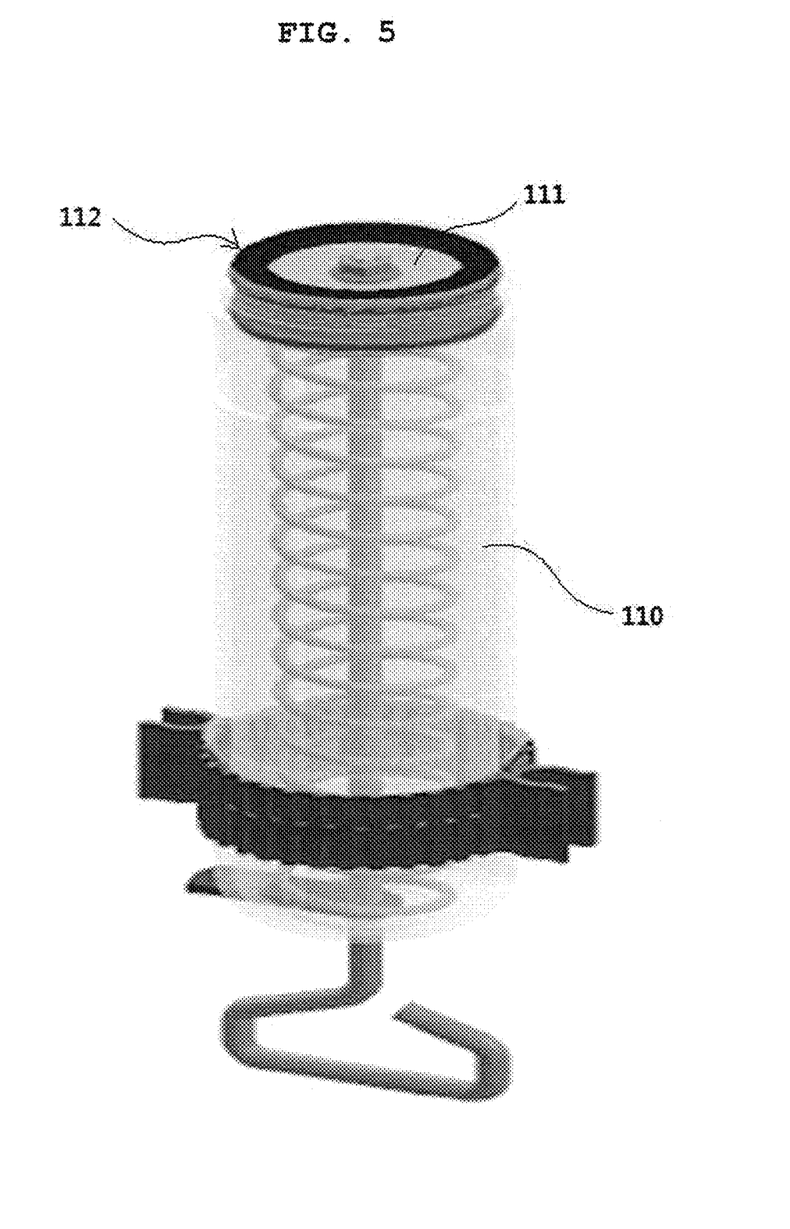
FIG. 5 is a perspective view showing a storage tank in the hybrid power type of the automatic grease gun according to an embodiment of the present invention.
Figure 6:
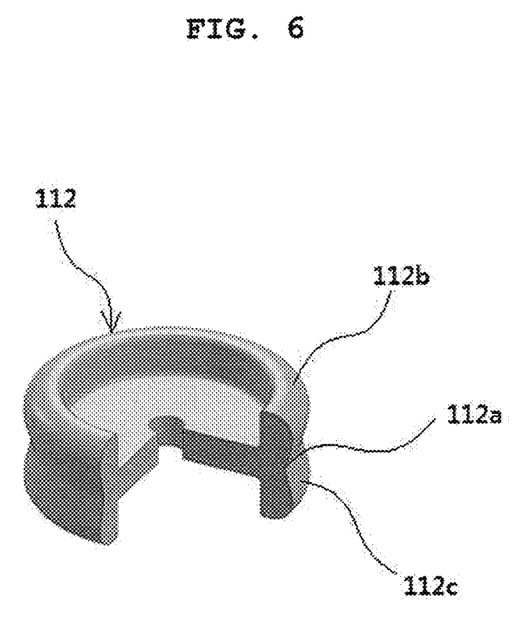
FIG. 6 is a perspective view showing a sealing member in the storage tank shown in FIG. 5.

FIG. 5 is a perspective view showing a storage tank in the hybrid power type of the automatic grease gun according to an embodiment of the present invention. FIG. 6 is a perspective view showing a sealing member in the storage tank shown in FIG. 5.

As shown in FIGS. 5 and 6, the storage tank 110 includes a transparent material such that a residual amount of the grease stored in the storage tank 110 is checked by a naked eye of a user. As the storage tank 110 is formed of the transparent material, the user can easily check time to supplement the storage tank 110 with grease, and an amount of grease supplied to each grease supply target, thereby preventing grease from being insufficiently supplied to the relevant grease supply target as the grease in the storage tank 110 is used up in the middle of supplying the grease, and preventing the grease from being supplied to the grease supply target without checking for a small amount of grease remaining in the storage tank 110. Accordingly, the grease may be more efficiently supplied by the hybrid power type of the automatic grease gun 100.

In addition, the storage tank 110 may include a plate 111 provided inside the storage tank 110 to compress or suck the stored grease in a discharging operation of the discharge part 120 or in a grease charging operation, and a double sealing member 112 coupled to the plate 111 along a circumference of the plate 111, and having sealing parts formed at both sides of a recessed part 112a formed at a center of the plate 111 such that the two sealing parts 112b and 112c make contact with an inner surface of the storage tank 110.

Through the above configuration, the grease does not flow in through a rear surface of the plate 111 in the process of filling grease into the storage tank 110 or compressing the grease for the storage tank 110, thereby preventing the surface of the storage tank 110 from being obscured due to the grease flowing in through a rear surface of the plate 111, so that a worker does not check an amount of grease remaining in the storage tank 110 with the naked eye of the worker.

In addition, since the storage tank 110 is generally manufactured in an injection molded structure, which is transparent, to ensure the transparency of the storage tank 110. The storage tank 110 has upper and lower portions different from each other in an inner diameter due to the characteristic of the injected molded structure. Accordingly, the storage tank 110 may not be perfectly sealed through a sealing member having one sealing area. Further, when a cartridge is used, even though the cartridge has a uniform thickness at the top and the bottom thereof, the inner diameter of the storage tank 110 is reduced by the thickness of the cartridge. Accordingly, the sealing member having one sealing area may not seal both tubs having mutually different inner diameters.

Therefore, according to the present embodiment, a double-structured sealing member 112 having two sealing parts 112b and 112c is provided. Accordingly, when the storage tank 110 has a larger inner diameter due to the use of the storage tank in a bulk type, the two sealing parts 112b and 112c are used in the form of a double-sealing structure making contact with the inner surface of the relevant storage tank 110, thereby realizing complete sealing, and preventing the grease from flowing in through the rear surface of the plate 111, so that the transparency of the relevant storage tank 110 may be completely ensured. In addition, when the inner diameter of the storage tank 110 is relatively reduced due to the use of the cartridge type, the double-structured sealing member 112 is turned over so that the inner diameter of the double-structured sealing member 112 is relatively reduced and used. Accordingly, the relevant storage tank 110 may have an excellent sealing function.

In detail, the storage tank 110 may have a structure to employ both of the cartridge and the bulk manner according to the structures and the functions of the double-structured sealing member 112. Accordingly, when the grease is filled in the storage tank 110, the work of filling the grease may be conveniently performed, and the efficiency in the use of the storage tank 110 may be improved.

Figure 7:
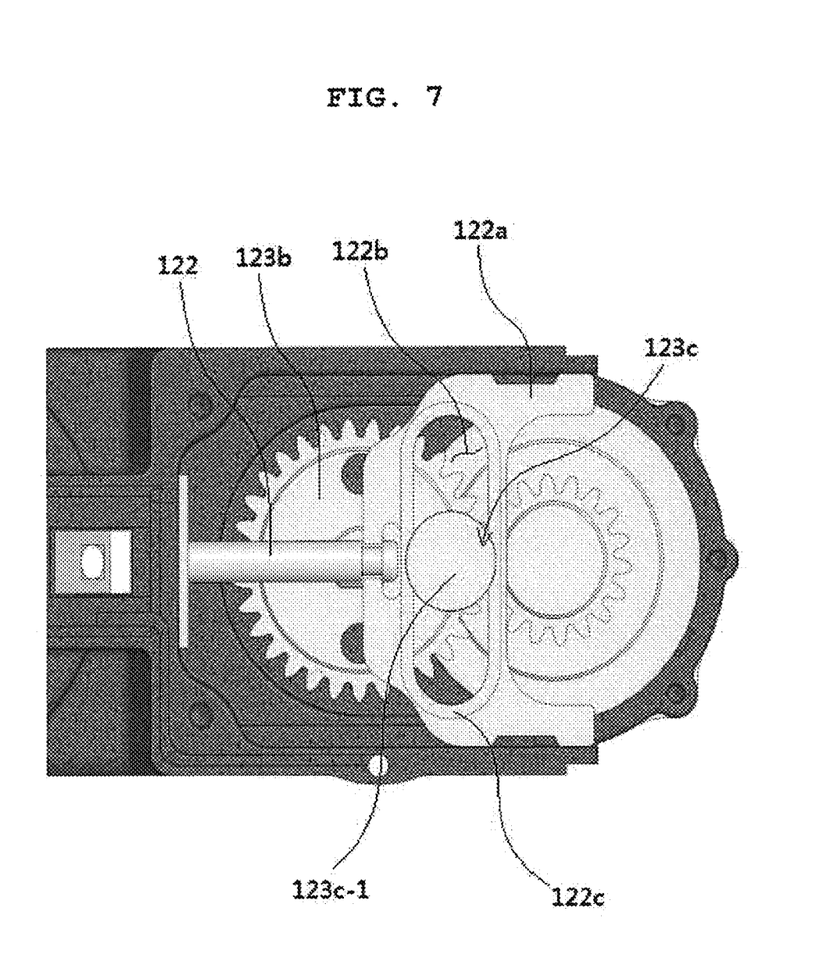
FIG. 7 is a view showing a main component of a discharge part in the hybrid power type of the automatic grease gun according to an embodiment of the present invention.

FIG. 7 is a view showing a main component of a discharge part in the hybrid power type of the automatic grease gun according to an embodiment of the present invention. FIG. 8 is a sectional view showing a main component of the discharge part shown in FIG. 7. Hereinafter, the main component and the main operation of the main component of the discharge part 120 in the hybrid power type of the automatic grease gun according to one embodiment of the present invention will be described with reference to FIG. 2.

As shown in drawings, the discharge part 120 is mainly divided into a pump chamber 121 and a rotary power part 123.

The pump chamber 121 includes a sliding piston 122 to pump grease. The pump chamber 121 is connected with the drain port 140. In detail, an installation area of the sliding piston 122 in the pump chamber 121 and an area extending to the drain port 140 from the installation area of the sliding piston 122 correspond to main areas of the grease discharge line 130.

The sliding piston 122 includes a cam to operate the sliding piston 122 to generate the rotary power of the cam.

The rotary power part 123 may include a power source 123a, a gear 123b, and a rotation pin 123c.

The power source 123a generates the rotary power. According to the present embodiment, the power source 123a includes a motor 123a-1 and a deceleration part 123a-2 operating in cooperation with a driving shaft of the motor 123a-1. Although the deceleration part 123a-2 includes a planet gear for the illustrative purpose, the present invention is not limited thereto.

The gear 123b rotates based on the rotary power of the power source 123a. According to the present embodiment, the gear 123b is geared with the planet gear to rotate in cooperation with the planet gear.

The rotation pin 123c is eccentrically coupled to the gear 123b to rotate while forming a circular trajectory as the gear 123b is rotated.

In addition, the sliding piston 122 may include a slider 122a and a piston body 122d.

The slider 122a is formed therein with a rectangular pin sliding hole for insertion of the rotation pin 123c and the guidance of sliding in a linear section to reciprocate in a direction perpendicular to a sliding direction of the rotation pin 123c when the rotation pin 123c rotates.

The piston body 122d has one end longitudinally provided and rotatably and removably coupled to the slider 122a so that the piston body 112d reciprocates in a direction the same as a sliding direction of the slider 122a.

In addition, the rotation pin 123c includes a head part 123c-1 having an expanded diameter provided at the one end longitudinally provided. The slider 122a includes a step part 122c to mount the head part 123c-1 along the circumference of the pin sliding hole 122b.

Through the above configuration, in the reciprocation movement of the sliding piston 122 for the pumping of the grease of the storage tank 110, the sliding piston 122c is guided by the slider 122a to stably reciprocate in a predetermined section with the minimized moving. Simultaneously, the rotation pin 123c reciprocates in the section along the pin sliding hole 122b, in the state that the head part 123c-1 is mounted on the step part 122c of the slider 122a, thereby preventing the rotation pin 123c from being vertically and horizontally heavily fluctuated or bounced. Accordingly, the power consumption of the rotary power part 123 including the factor 123a-1 may be minimized. In addition, as the torque of the rotary power part 123 is increased, an amount of discharged grease may be increased. When the discharge part 120 including the rotary power part 123 is operated, noise may be minimized.

In detail, when the planet gear of the deceleration part 123a-2 is directly coupled to the sliding piston 122c, the reduction gear ratio is relatively reduced, so that the torque may be reduced to increasingly consume current. Therefore, according to the present embodiment, deceleration is made in multiple steps through the above configuration, current consumption is reduced, and the number of rotations is ensured, thereby increasing an amount of discharged grease. For example, the final number of rotations becomes generally 200 through 3-step deceleration. However, according to the present embodiment, the final number of rotations becomes generally 200 through 4-step deceleration, thereby relatively reducing current consumption.

As recognized from the description made with reference to FIGS. 3 to 8, the hybrid power type of the automatic grease gun according to the present invention has a power supply structure of basically using power charged in the battery in operations for grease discharge, and automatically using power of the vehicle when the battery is fully discharged and can discharge the grease by the power charged in the battery when separating from the power of the vehicle, since the battery can be detachably embedded and charged with power of a vehicle.

In addition, even if the grease is continuously discharged inside in the state that the grease is not drained out for the grease supply target, as the grease in the grease discharge line is automatically returned to the storage tank, which is an original storage position, by a predetermined amount, the internal pressure of an internal grease discharge structure and a grease discharge line extending outwardly from the grease discharge structure can be uniformly maintained.

In addition, an amount of grease stored in the storage tank to be discharged out of the storage tank can be checked with a naked eye of a worker, and the storage tank having the grease can be used in both of cartridge and bulk types.

In addition, power consumption of the grease discharge part including the motor can be minimized, torque can be increased through the consumption of predetermined power to increase an amount of grease to be discharged, and noise can be reduced when the grease is discharged.

Although an exemplary embodiment of the disclosure has been described based on specific matters such as detailed elements, limited embodiments, and drawings for illustrative purposes, those skilled in the art will appreciate that the disclosure is not limited to the above embodiments, and various modifications, additions and substitutions are possible, without departing from the scope and spirit of the invention as disclosed in the accompanying claims.

Accordingly, the spirit of the present invention is not limited to the above-described embodiments, but attached claims, and equivalents and modifications thereof fall within the scope of the present invention.

What is claimed is:

1. A hybrid power type of an automatic grease gun comprising:
   a storage tank to store grease;
   a discharge part to discharge the grease from the storage tank;
   a drain port to drain out the grease which is discharged from the discharge part; and
   a power supply part to supply power to the discharge part, to supply power, which is received from moving equipment in connection with the power of the moving equipment, to a rechargeable battery as power to be charged in the rechargeable battery, to first supply the power charged in the rechargeable battery to the discharge, and to automatically and directly supply the power of the moving equipment to the discharge part when the rechargeable battery is fully discharged,
   wherein the power supply part comprises:
   a connection part mechanically and electrically detachably connected with the power of the moving equipment;
   a charging circuit that is connected with an output terminal of the connection part to supply the power of the moving equipment to the rechargeable battery or the discharge part, automatically cuts off the supply of the power to the rechargeable battery when the rechargeable battery is fully charged with the power, and automatically supplies the power of the moving equipment to the discharge part through the connection part when the rechargeable battery is fully discharged; and
   the rechargeable battery connected with an output terminal of the charging circuit in parallel to the discharge part.

2. The hybrid power type of the automatic grease gun of claim 1, wherein the power supply part further comprises an operating switch connected with the discharge part in parallel connection with the charging circuit and an output terminal of the rechargeable battery.

3. The hybrid power type of the automatic grease gun of claim 1, wherein the connection part is mechanically and electrically detachably connected with the charging circuit.

4. The hybrid power type of the automatic grease gun of claim 1, wherein the storage tank includes a transparent material such that a residual amount of the grease is checked by a naked eye of a user.

5. A hybrid power type of an automatic grease gun comprising:
   a storage tank to store grease;
   a discharge part to discharge the grease from the storage tank;
   a drain port to drain out the grease which is discharged from the discharge part;
   a power supply part to supply power to the discharge part, to supply power, which is received from moving equipment in connection with the power of the moving equipment, to a rechargeable battery as power to be charged in the rechargeable battery, to first supply the power charged in the rechargeable battery to the discharge, and to automatically and directly supply the power of the moving equipment to the discharge part when the rechargeable battery is fully discharged;
   a grease discharge line extending from the discharge part toward the drain port; and
   a bypass line having ends communicating with the storage tank to circularly supply the grease, which flows in the grease discharge line, to the storage tank when the grease is not drained through the drain port in a situation that the grease is discharged from the storage tank through the discharge part.

6. The hybrid power type of the automatic grease gun of claim 5, wherein the bypass line comprises check valve mounted in a connection area with the grease discharge line or mounted on the bypass line to be open when an internal pressure of the grease discharge line or the bypass line is increased to more than predetermined pressure such that the grease is bypassed to the storage tank.

7. A hybrid power type of an automatic grease gun comprising:
   a storage tank to store grease;
   a discharge part to discharge the grease from the storage tank;
   a drain port to drain out the grease which is discharged from the discharge part; and
   a power supply part to supply power to the discharge part, to supply power, which received from moving equipment in connection with the power of the moving equipment, to a rechargeable battery as power to be charged in the rechargeable battery, to first supply the power charged in the rechargeable battery to the discharge, and to automatically and directly supply the power of the moving equipment to the discharge part when the rechargeable battery is fully discharged, wherein the storage tank comprises:
  a plate provided inside the storage tank to compress or suck the stored grease in a discharging operation of the discharge part or in a grease charging operation; and
  a double sealing member coupled to the plate along a circumference of the plate, and having sealing parts formed at both sides of a recessed part formed at a center of the plate such that the two sealing parts make contact with an inner surface of the storage tank.

8. A hybrid power type of an automatic grease gun comprising:
  a storage tank to store grease;
  a discharge part to discharge the grease from the storage tank;
  a drain port to drain out the grease which is discharged from the discharge part; and
  a power supply part to supply power to the discharge part, to supply power, which is received from moving equipment in connection with the power of the moving equipment, to a rechargeable battery as power to be charged in the rechargeable battery, to first supply the power charged in the rechargeable battery to the discharge, and to automatically and directly supply the power of the moving equipment to the discharge part when the rechargeable battery is fully discharged, wherein the discharge part comprises:
  a pump chamber including a sliding piston to pump the grease of the storage tank and connected with the discharge port; and
  a rotary power part comprising a cam for an operation of the sliding piston to generate rotary power of the cam.

9. The hybrid power type of the automatic grease gun of claim 8, wherein
  the rotary power part comprises a power source to generate the rotary power, a gear rotating based on the rotary power of the power source, and a rotation pin eccentrically coupled to the gear to rotate while forming a circular trajectory as the gear is rotated,
  the sliding piston comprises a slider formed therein with a rectangular pin sliding hole for insertion of the rotation pin and guidance of sliding along a linear section to reciprocate in a direction perpendicular to a sliding direction of the rotation pin when the rotation pin is rotated, and a piston body having one end longitudinally provided and rotatably and movably coupled to the slider to reciprocate in a direction identical to a sliding direction of the slider,
  the rotation pin comprises a head part having an expanded diameter provided at one end longitudinally provided, and
  the slider comprises a step part to mount the head part along a circumference of the pin sliding hole.

* * * * *